(12) United States Patent
Hoskins et al.

(10) Patent No.: US 6,488,452 B1
(45) Date of Patent: Dec. 3, 2002

(54) DRILL AND DRIVE APPARATUS HAVING ARRANGEMENT TO ACCOMMODATE LONG DRILL BITS

(75) Inventors: Todd A. Hoskins, Anderson, SC (US); Kevin M. Ward, Louisville, KY (US)

(73) Assignee: Vermont American Corporation, Louisville, KY (US)

( * ) Notice: Subject to any disclaimer, the term of this patent is extended or adjusted under 35 U.S.C. 154(b) by 156 days.

(21) Appl. No.: 09/630,989

(22) Filed: Aug. 2, 2000

Related U.S. Application Data
(60) Provisional application No. 60/148,549, filed on Aug. 12, 1999.

(51) Int. Cl.$^7$ .................... B23B 51/08; B23B 31/107
(52) U.S. Cl. .................... 408/239 R; 81/451; 279/14; 279/82; 279/904; 279/905; 408/226
(58) Field of Search ................. 279/14, 79–82, 279/89, 90, 143–145, 904, 905; 408/239 R, 239 A, 226; 81/451

(56) References Cited

U.S. PATENT DOCUMENTS

| | | | |
|---|---|---|---|
| 1,805,005 A | | 5/1931 | Phillips |
| 2,224,480 A | | 12/1940 | Kartarik |
| 2,338,765 A | | 1/1944 | Hartman |
| 2,792,726 A | | 5/1957 | Vick |
| 2,826,104 A | | 3/1958 | Morin |
| 3,023,015 A | | 2/1962 | Pankow |
| 3,053,118 A | * | 9/1962 | Lavallee .................... 408/226 |
| 3,583,715 A | | 6/1971 | Jahrl |
| 4,092,753 A | | 6/1978 | Fuhrmann |
| 4,107,800 A | | 8/1978 | Jorgensen |
| 4,202,557 A | * | 5/1980 | Haussmann et al. .......... 279/82 |
| 4,353,670 A | | 10/1982 | Jorgensen |
| 4,551,875 A | | 11/1985 | Getz et al. |
| 4,573,839 A | | 3/1986 | Finnegan |
| 4,605,348 A | | 8/1986 | DeCaro |
| 4,676,703 A | | 6/1987 | Swanson |
| 4,692,073 A | | 9/1987 | Martindell |
| 4,736,658 A | | 4/1988 | Jore |
| 4,852,196 A | | 8/1989 | Martin |
| 4,900,202 A | * | 2/1990 | Wienhold .................... 279/905 |

(List continued on next page.)

FOREIGN PATENT DOCUMENTS

| | | | |
|---|---|---|---|
| JP | 2-100807 A | 4/1990 | |
| WO | WO-98/51450 A2 | * 11/1998 | .................. 279/14 |

Primary Examiner—Steven C. Bishop
(74) Attorney, Agent, or Firm—Maginot, Moore & Bowman, LLP (57) ABSTRACT

A drill and drive apparatus includes a tube assembly which defines a tool chamber, the tube assembly including a shank adapted to be received within a chuck of a drill. The apparatus further includes a tool holder which is configured to be at least partially received in the tool chamber of the tube assembly, the tool holder having (i) a first tool locking mechanism at a first end portion thereof, and (ii) a second tool locking mechanism at a second end portion thereof. The drill and drive apparatus further includes a tube locking mechanism which is configured to releasably lock the tool holder to the tube assembly when the tool holder is at least partially received in the tool chamber. The shank defines (i) a first shank opening, (ii) a second shank opening, and (iii) a bit passage extending from the first shank opening to the second shank opening, whereby a drill bit locked to the tool holder by the first tool locking mechanism may extend through the first shank opening, the bit passage, and the second shank opening when the tool holder is locked to the tube assembly.

25 Claims, 6 Drawing Sheets

U.S. PATENT DOCUMENTS

| | | | |
|---|---|---|---|
| 4,954,025 A | | 9/1990 | Crawford et al. |
| 4,976,173 A | | 12/1990 | Yang |
| 5,013,194 A | | 5/1991 | Wienhold |
| 5,029,498 A | | 7/1991 | Kinsey |
| 5,038,435 A | | 8/1991 | Crawford et al. |
| 5,097,555 A | | 3/1992 | Dwyer |
| 5,129,118 A | | 7/1992 | Walmesley |
| 5,309,799 A | * | 5/1994 | Jore .............................. 81/451 |
| 5,417,527 A | | 5/1995 | Wienhold |
| 5,470,180 A | * | 11/1995 | Jore ....................... 408/239 R |
| D365,113 S | | 12/1995 | Ronan |
| 5,586,847 A | | 12/1996 | Mattern, Jr. et al. |
| D394,865 S | | 6/1998 | Ronan |
| 5,779,404 A | | 7/1998 | Jore |
| 5,806,381 A | | 9/1998 | Lin |
| 5,975,815 A | * | 11/1999 | Zierpka et al. .............. 408/226 |
| 6,302,408 B1 | * | 10/2001 | Zierpka ........................ 279/14 |
| 6,347,914 B1 | * | 2/2002 | Boyle et al. ............ 408/239 A |
| 6,394,715 B1 | * | 5/2002 | Boyle et al. ............ 408/239 R |

\* cited by examiner

DRILL AND DRIVE APPARATUS HAVING ARRANGEMENT TO ACCOMMODATE LONG DRILL BITS

This application claims the benefit of U.S. Provisional Application Serial No. 60/148,549, filed Aug. 12, 1999.

BACKGROUND OF THE INVENTION

The present invention relates generally to a drill and drive apparatus, and more particularly to a drill and drive apparatus having a shank configured to accommodate a long drill bit when such long drill bit is being stowed within the assembly.

Throughout the years, various devices have been designed which allows an individual operating an electric drill to quickly change the tool being driven by the drill for another tool. For example, U.S. Pat. No. 4,573,839 (issued to Finnegan), discloses a drill and drive apparatus having a hollow main body portion which is adapted to receive a tool holder therein. The main body portion includes a shank which extends from the main body portion. The shank is secured to a chuck of the drill during use thereof. The tool holder is configured to releasably lock a drill bit to one of its ends, and lock a screwdriver bit to the other of its ends. The apparatus further includes a locking mechanism which operates to releasably lock the tool holder to the main body portion. During operation of the Finnegan apparatus, the tool holder may be secured partially within the main body portion while exposing the drill bit. Thereafter, the user may operate the apparatus to drill a hole in a workpiece. Then, the user may quickly release the tool holder from the main body portion, and rotate the tool holder 180°. Thereafter, the user may insert the rotated tool holder into the main body portion and quickly relock the tool holder thereto with the screwdriver bit exposed. Then, the user may place the tip of a threaded side of a screw in the hole located in the workpiece, and drive the screw into the workpiece with the drill and drive apparatus and the drill.

One drawback with the drill and drive devices possessing the above-described type of design is that the size of the drill bit that is able to be used with the device is quite limited. Such limitation is attributable to the fact the drill bit, when not being used, is stowed in the hollow portion of the main body which has the shank extending therefrom. In order maintain a reasonable size of the device, the main body portion of the device has a limited size which correspondingly limits the size of the drill bit stowed therein. Also, the shank of the device is typically positioned and configured to prevent use of a drill bit possessing a length substantially longer than that permitted by the size of the main body portion.

Another drawback with designs of the above described type is that such designs are relatively mechanically complex, and consequently, are relatively expensive to manufacture.

What is needed therefore is a drill and drive assembly which overcomes one or more drawbacks of the previously designed devices. For example, what is needed is a drill and drive apparatus that is able to use a drill bit having a length which is not limited by the size of the main body portion of the device or the position and configuration of the shank of the device. Moreover, for example, what is needed is a drill and drive apparatus that is relatively less mechanically complex and inexpensive to manufacture.

SUMMARY OF THE INVENTION

In accordance with one embodiment of the present invention, there is provided a drill and drive apparatus. The apparatus includes a tube assembly which defines a tool chamber, the tube assembly including a shank adapted to be received within a chuck of a drill. The apparatus further includes a tool holder which is configured to be at least partially received in the tool chamber of the tube assembly, the tool holder having (i) a first tool locking mechanism at a first end portion thereof, and (ii) a second tool locking mechanism at a second end portion thereof. The apparatus additionally includes a tube locking mechanism which is configured to releasably lock the tool holder to the tube assembly when the tool holder is at least partially received in the tool chamber. The shank defines (i) a first shank opening, (ii) a second shank opening, and (iii) a bit passage extending from the first shank opening to the second shank opening, whereby a drill bit locked to the tool holder by the first tool locking mechanism may extend through the first shank opening, the bit passage, and the second shank opening when the tool holder is locked to the tube assembly.

Pursuant to another embodiment of the present invention, there is provided a drill and drive apparatus. The apparatus includes a tube assembly having (i) a tube body which defines a tool chamber, and (ii) a shank extending from the tube body. The apparatus further includes a tool holder which is configured to be at least partially received in the tool chamber of the tube assembly, the tool holder having (i) a first tool locking mechanism at a first end portion thereof, and (ii) a second tool locking mechanism at a second end portion thereof. The shank defines (i) a first shank opening, (ii) a second shank opening, and (iii) a bit passage extending from the first shank opening to the second shank opening, whereby a drill bit locked to the tool holder by the first tool locking mechanism may extend through the first shank opening, the bit passage, and the second shank opening when the tool holder is at least partially received into the tool chamber.

According to still another embodiment of the present invention, there is provided a drill and drive apparatus. The apparatus includes a tube assembly which defines a tool chamber, the tube assembly including a shank adapted to be received within a chuck of a drill. The apparatus further includes a tool holder which is configured to be at least partially received in the tool chamber of the tube assembly, the tool holder having (i) a holder body, (ii) a first tool locking mechanism located at a first end portion of the holder body, (iii) a second tool locking mechanism located at a second end portion of the holder body, and (iv) a movable screw sleeve positioned around the tool holder, the movable screw sleeve being movable relative to the holder body in an axial direction defined by an axis of rotation of the tool holder during operation of the drill and drive apparatus. In addition, the apparatus includes a tube locking mechanism which is configured to releasably lock the tool holder to the tube assembly when the tool holder is at least partially received in the tool chamber.

It is therefore an object of the present invention to provide a new and useful drill and drive apparatus.

It is another object of the present invention to provide an improved drill and drive apparatus.

It is yet another object of the present invention to provide a drill and drive apparatus that is able to use a drill bit having a length which is not limited by the size of the main body portion of the apparatus or the position and configuration of the shank of the apparatus.

It is still another object of the present invention to provide a drill and drive apparatus that is relatively less mechanically complex and inexpensive to manufacture.

Other objects and benefits of the present invention can be discerned from the following description and accompanying drawings.

DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
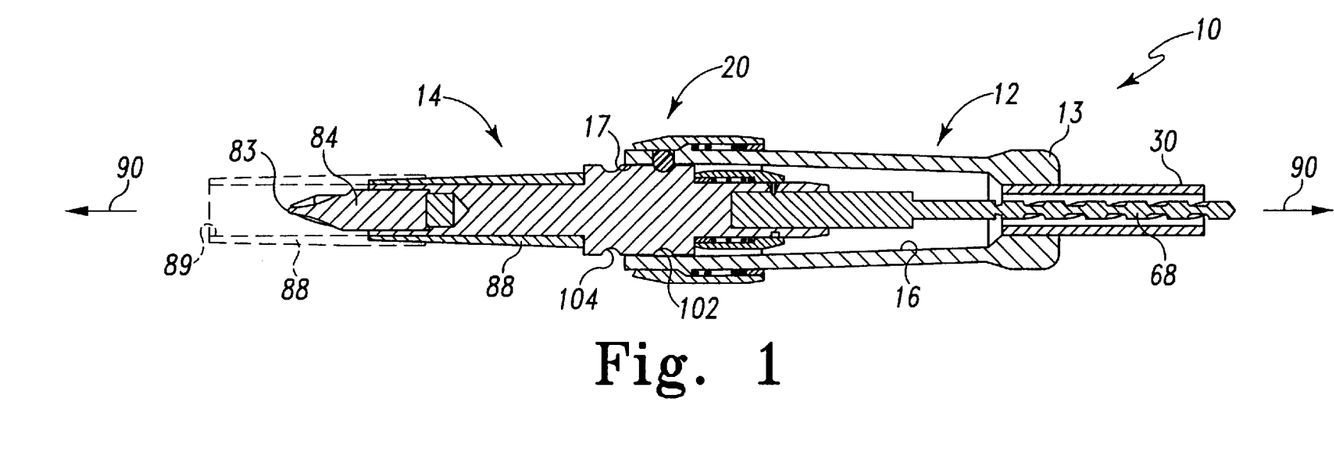
FIG. 1 is a cross sectional view of the drill and drive apparatus which incorporates the features of the present invention therein.
Figure 2:
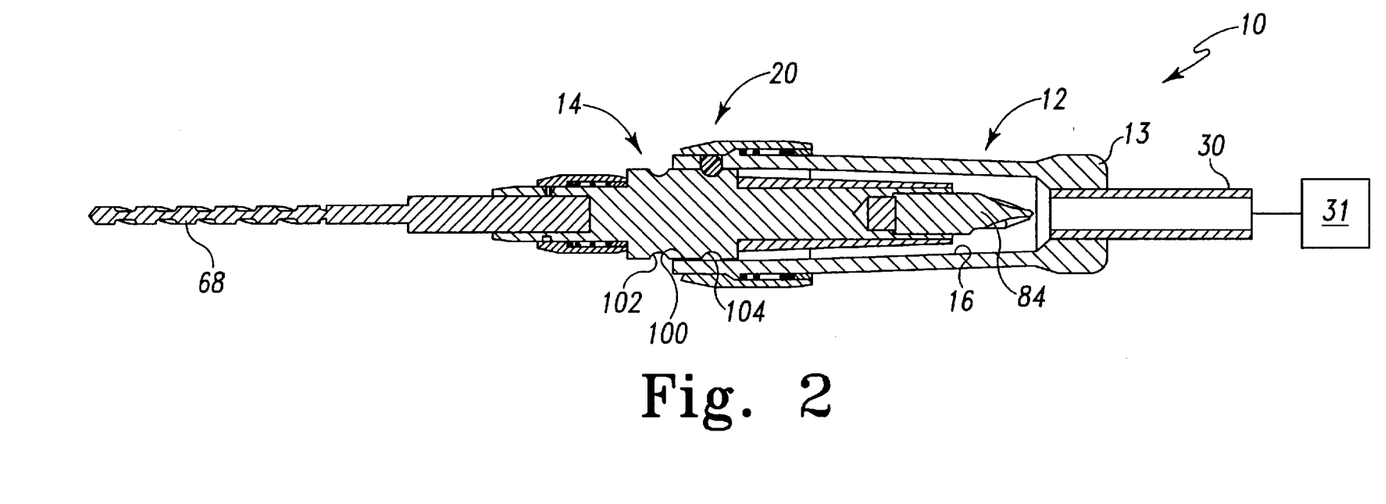
FIG. 2 is a view similar to FIG. 1, but showing the tool holder rotated 180° relative to its position depicted in FIG. 1.
Figure 3:
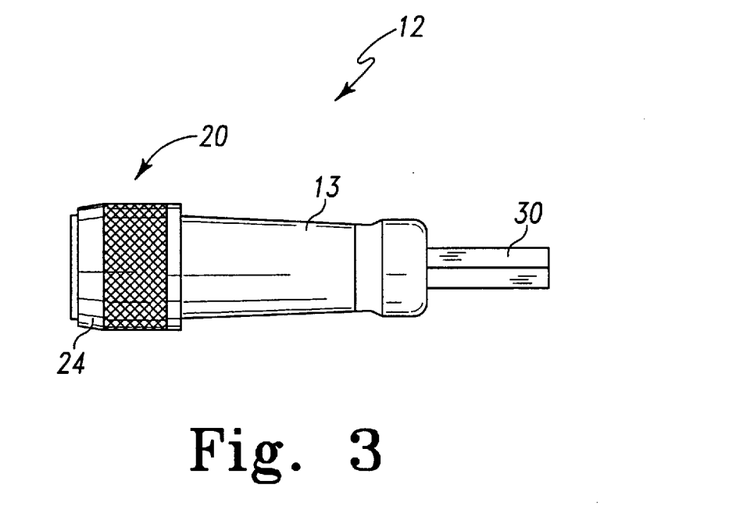
FIG. 3 is an elevational view of the tube assembly of the drill and drive apparatus of FIG. 1.
Figure 4:
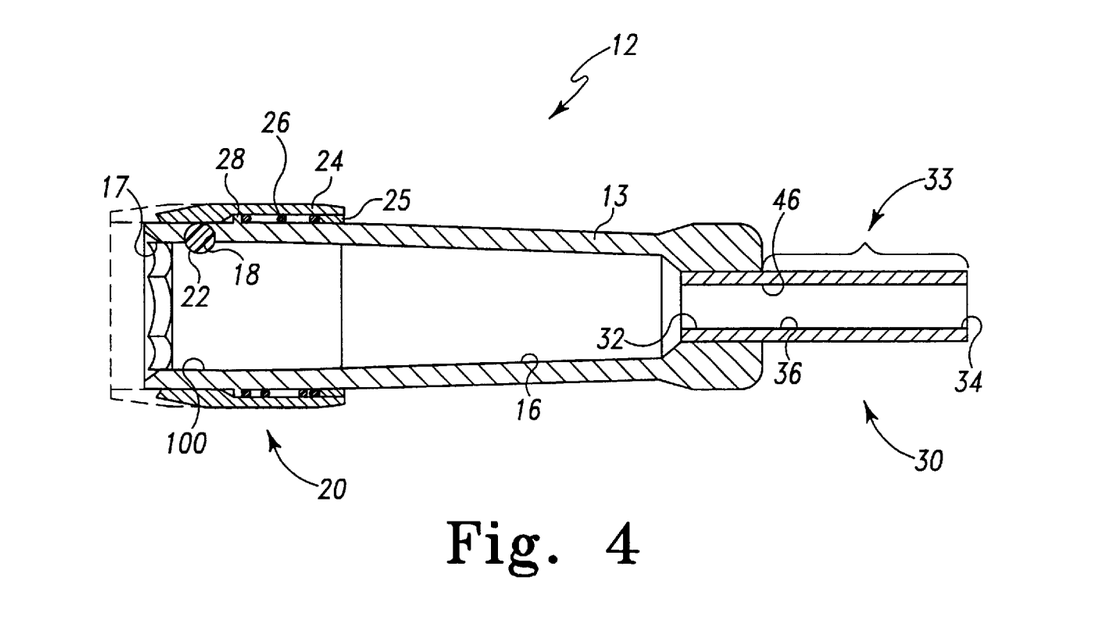
FIG. 4 is an enlarged cross sectional view of the tube assembly of the drill and drive apparatus of FIG. 1.

Referring now to FIGS. 1–2, there is shown a drill and drive apparatus 10 which incorporates the features of the present invention therein. The drill and drive apparatus 10 includes a tube assembly 12 and a tool holder 14. The tube assembly 12 includes a tube body 13 which has tool chamber 16 defined therein. The tube body 13 includes a tool side opening 17 which allows access to the tool chamber 16. The tool holder 14 is partially received within the tool chamber 16 by advancement of the tool holder through the tool-side opening 17 as shown in FIGS. 1–2. The tube body 13 has a ball aperture 18 defined therein (see FIG. 4). The ball aperture 20 communicates with the tool chamber 16 as shown in FIG. 4. More specifically, the ball aperture 20 extends entirely through a wall of the tube body 13 so as to create a communicating passage between the tool chamber 16 and the outside of the tube body 13. The ball aperture 20 is configured at its end adjacent to the tool chamber 16 to be narrower than the diameter of an associated ball 22 so as to prevent the ball 22 from advancing into the tool chamber 16.

The apparatus 10 further includes a tube locking mechanism 20 which is shown in detail in FIG. 4. The tube locking mechanism 20 is configured to releasably lock the tool holder 14 to the tube assembly 12 when the tool holder 14 is received within the tool chamber 16 of the tube assembly 12. The tube locking mechanism 20 includes the ball 22 which is positioned within the ball aperture 18 as shown in FIG. 4. The tube locking mechanism 20 further includes a tube locking collar 24 which is positioned around the tube body 13. The tube locking collar 24 includes a ring member 25 attached at an end thereof. Moreover, the tube locking mechanism 20 includes a tube spring 26 which is interposed between the tube body 13 and the tube locking collar 24. The tube spring 26 is retained between the ring member 25 and a shoulder 28 defined by the tube body 13 as shown in FIG. 4.

Figure 7:
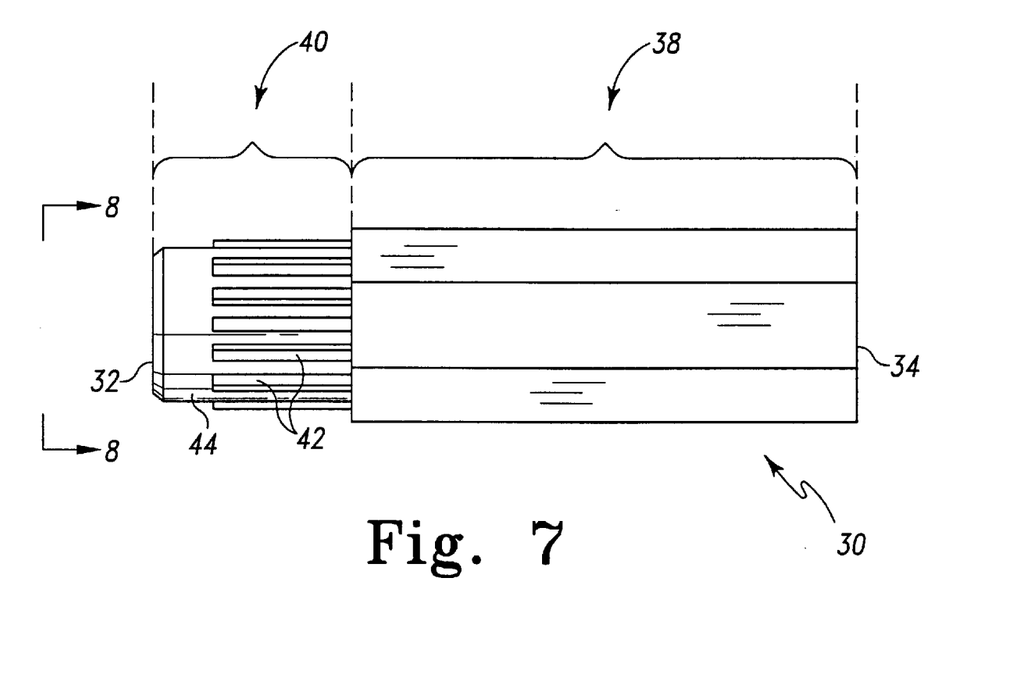
FIG. 7 is an enlarged elevational view of the shank of the tube assembly of the drill and drive apparatus of FIG. 1.
Figure 8:
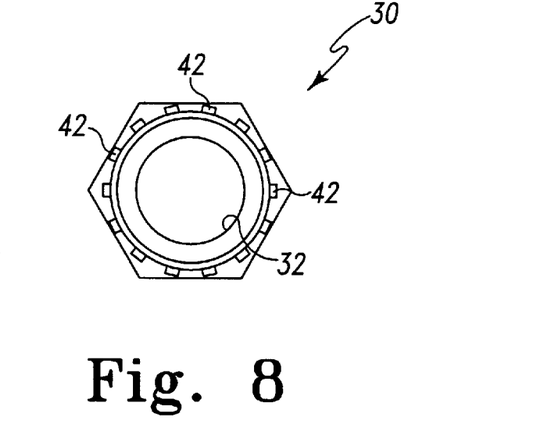
FIG. 8 is side elevational view of the shank as taken along the lines 8—8 of FIG. 7.

The tube assembly 12 further includes a shank 30 adapted to be received into a chuck of an electric drill which is schematically shown by the reference number 31 in FIG. 2. The shank 30 defines a first shank opening 32, a second shank opening 34, and a bit passage 36 extending from the first shank opening 32 to the second shank opening 34 as shown in FIG. 4. The shank 30 is made up of a chuck segment 38 and an attachment segment 40 as shown in FIG. 7. The chuck segment 38 possesses a polygonal shape which is preferably hexagonal. The attachment segment 40 includes a number of splines 42 which extend outwardly from a base portion 44 of the attachment segment 40. The attachment segment 40 is friction fit into a drill-side passage 46 defined in the tube body 13 as shown in FIG. 4. During operation of the drill and drive apparatus 10, rotation of the chuck segment 38 by the electric drill 31 causes rotation of the tube body 13. Note that the chuck segment 38 is located outside of the tube body 13 so that, during operation of the drill and drive apparatus 10, the chuck segment is received into the chuck of the drill 31.

Figure 6:
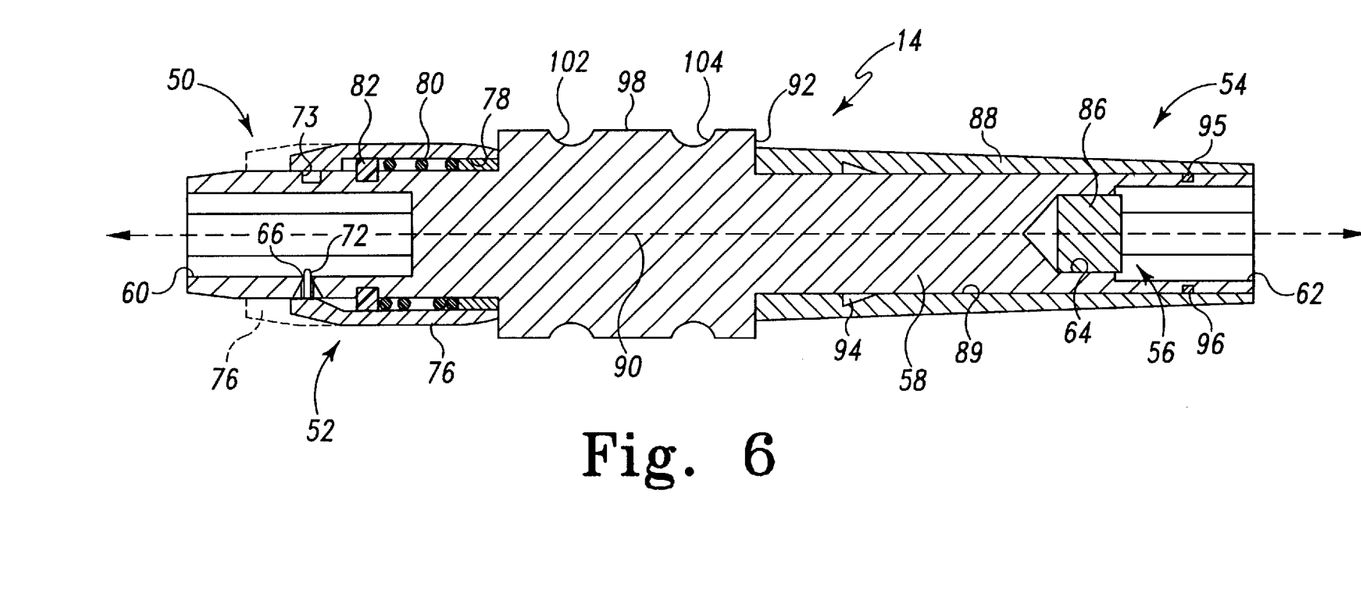
FIG. 6 is an enlarged cross sectional view of the tube assembly of the drill and drive apparatus of FIG. 1.

As shown in FIG. 6, the tool holder 14 includes a first end portion 50 having a first tool locking mechanism 52, and a second end portion 54 having a second tool locking mechanism 56. The tool holder 14 further includes a holder body 58 having a first tool recess 60 and a second tool recess 62 defined therein. The holder body 58 further has a magnet recess 64 defined therein. In addition, the holder body 58 further has a pin aperture 66 defined therein which communicates with the first tool recess 60. More specifically, the pin aperture 66 extends entirely through a wall of the holder body 58 so as to create a communicating passage between the tool chamber the first tool recess 60 and the outside of the holder body 58.

Figure 10:
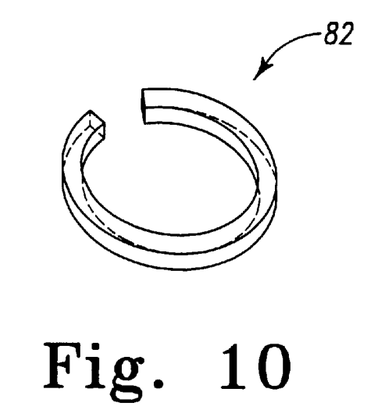
FIG. 10 is a perspective view of the split ring of the first tool locking mechanism of the drill and drive apparatus of FIG. 1.
Figure 11:
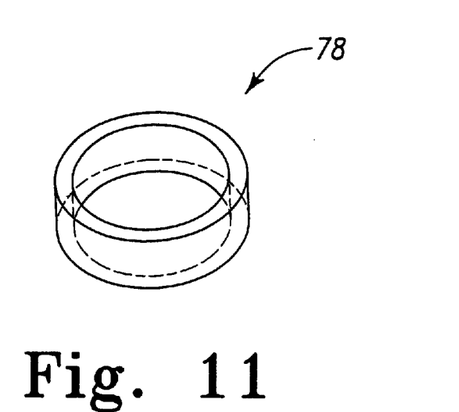
FIG. 11 is a perspective view of the back-up ring of the first tool locking mechanism of the drill and drive apparatus of FIG. 1.
Figure 12:
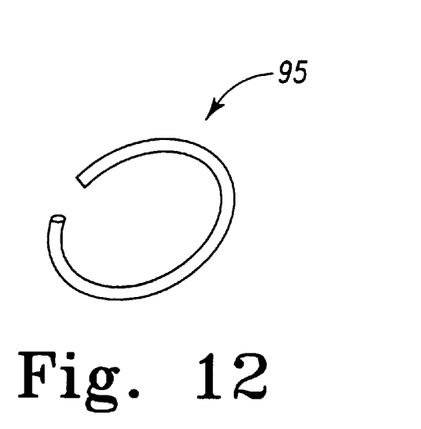
FIG. 12 is a perspective view of the C-ring of the tool holder of the drill and drive apparatus of FIG. 1.
Figure 13:
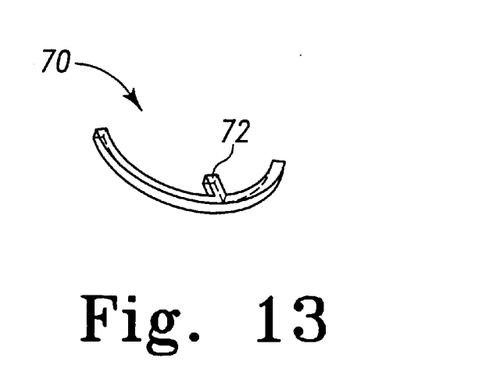
FIG. 13 is a perspective view of the E-ring of the first tool locking mechanism of the drill and drive apparatus of FIG. 1.
Figure 14:
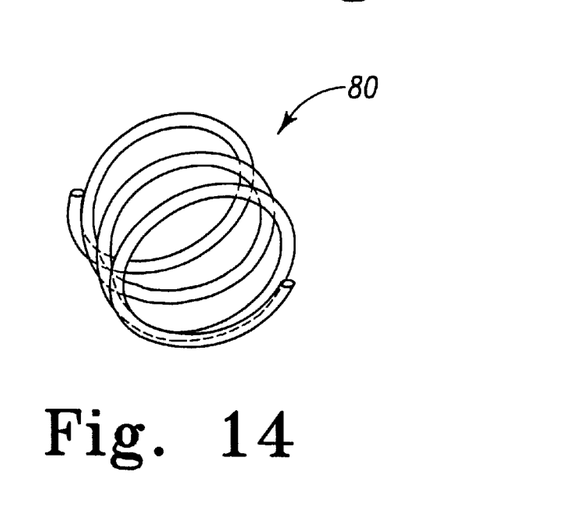
FIG. 14 is a perspective view of the tool spring of the first tool locking mechanism of the drill and drive apparatus of FIG. 1.

The first tool locking mechanism 52 is configured to releasably lock a drill bit 68 to the tool holder 14. The first tool locking mechanism 52 includes an E-ring 70 having a central finger 72 (see FIG. 13). The E-ring is located in a groove 73 defined in the outer surface of the holder body 58. The central finger 72 is positioned within the pin aperture 66 as shown in FIG. 6. The first tool locking mechanism 52 further includes a tool locking collar 76 which is positioned around the holder body 58. The tool locking collar 76 includes a back-up ring 78 attached at an end thereof. Moreover, the first tool locking mechanism 52 further includes a tool spring 80 (see FIG. 14) interposed between the holder body 58 and the tool locking collar 76. The first tool locking mechanism 52 additionally includes a split ring 82 (see FIG. 10) which is positioned in another groove defined in the outer surface of the holder body 58. The tool spring 80 is retained between the back-up spring 78 and the split ring 82 as shown in FIG. 6.

The second tool locking mechanism 56 is configured to releasably lock a metallic screwdriver bit 84 to the tool holder 14. The second tool locking mechanism 56 includes a magnet 86 which is located in the magnet recess 64 of the holder body 58. The magnet 86 is comprised of a conventional magnetic material which is effective to generate a magnetic field within the second tool recess 62.

Figure 9:
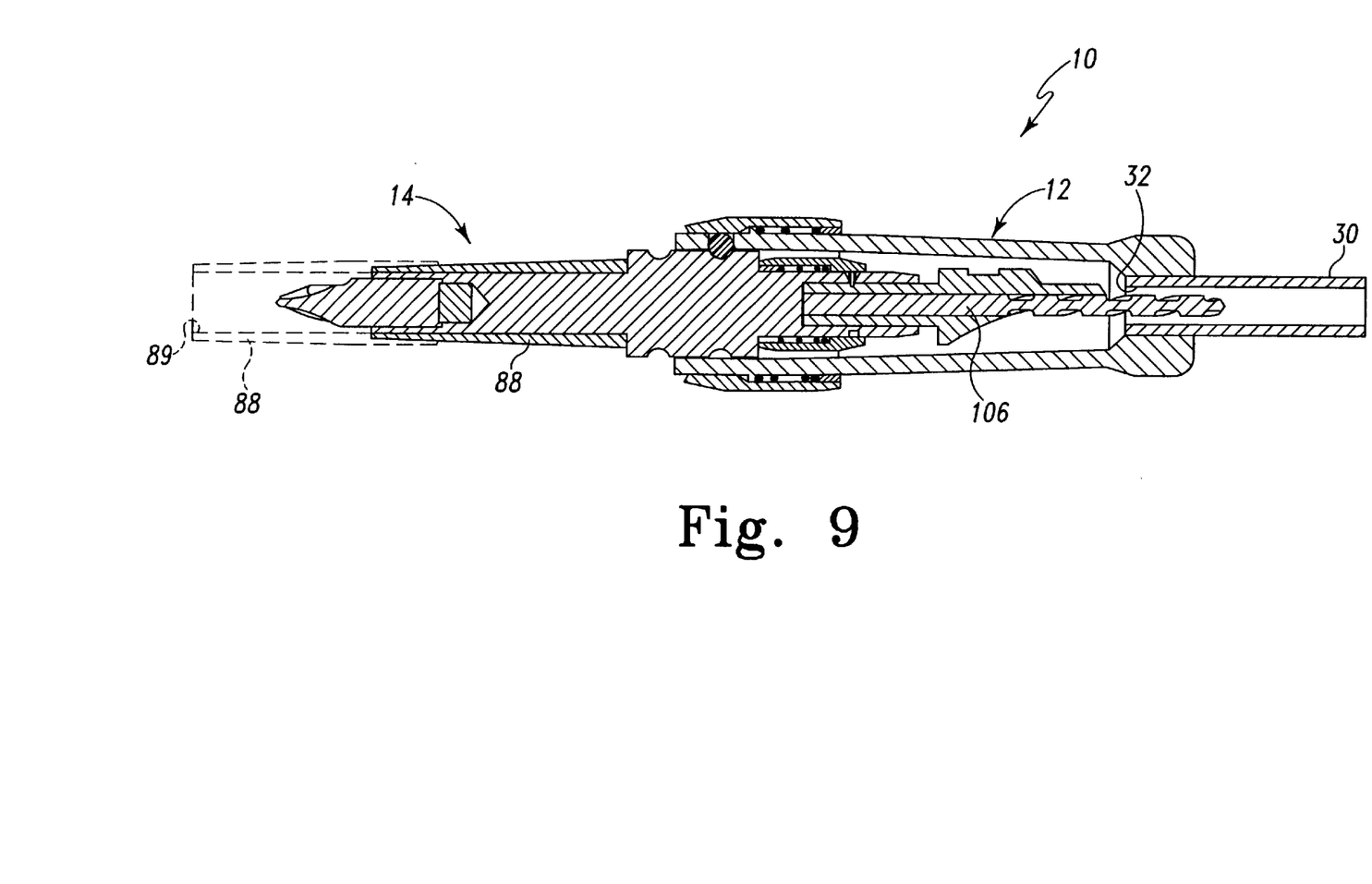
FIG. 9 is a view similar to FIG. 1, but showing a shorter drill bit being used with the drill and drive apparatus in relation to the drill bit shown in FIG. 1.

The tool holder 14 further includes a moveable screw sleeve 88 which is positioned around the holder body 58 as shown in FIG. 6. The screw sleeve 88 is movable relative to the holder body 58 in an axial direction which is defined by an axis of rotation 90 of the tool holder 14 during operation of the drill and drive apparatus 10. The screw sleeve 88 defines a screw guiding cavity 89 as shown in FIGS. 1 and 9.

Movement of the screw sleeve 88 is limited in the leftward direction depicted in FIG. 6 by abutment of the screw sleeve 88 against a wall 92 of the holder body 58. Movement of the screw sleeve 88 is limited in the rightward direction depicted in FIG. 6 by cooperation between a sleeve groove 94 and a C-ring 95 which is positioned around the holder body 58 and located in a groove 96 defined in the outer surface of the holder body 58. During operation of the drill and drive apparatus 10, a user is able to grasp screw sleeve 88 and hold it stationary while the other components of the tool holder 14 (e.g. the holder body 58) is rotated by the drill 31.

In addition, the tool holder 14 includes a polygonally shaped exterior drive surface 98 which is preferably hexagonally shaped. Conversely, the tube body 13 defines a polygonally shaped interior drive surface 100 which is located within the tool chamber 16 (see FIGS. 2 and 4). The interior drive surface 100 cooperates with the exterior drive surface 98 when the tool holder 14 is locked to the tube assembly 12 such that rotation of the tube assembly 12 during operation of the drill and drive apparatus 10 causes rotation of the tool holder 14.

Figure 5:
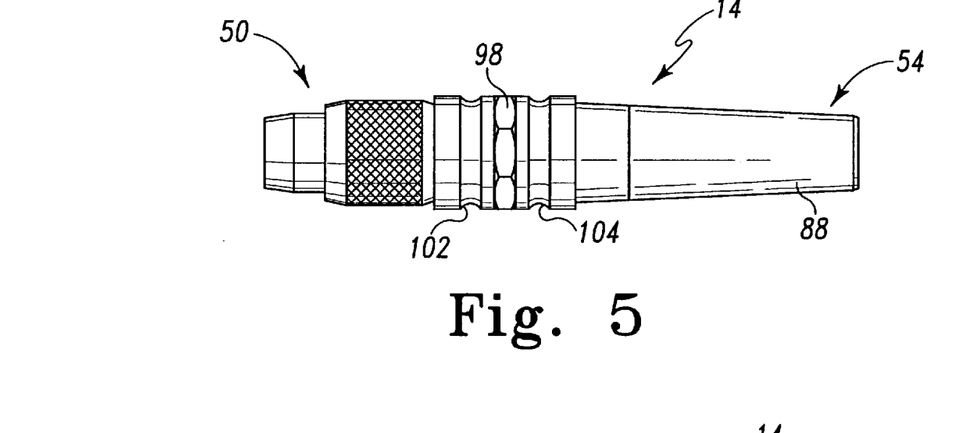
FIG. 5 is an elevational view of the tool holder of the drill and drive apparatus of FIG. 1.

The tool holder 14 further includes a first locking groove 102 defined therein. The first locking groove 102 is located on a first side of the exterior drive surface 98 as shown in FIGS. 5 and 6. The tool holder 14 also includes a second locking groove 104 defined therein. The second locking groove 104 is located on a second side of the exterior drive surface 98 as shown in FIGS. 5 and 6.

Operation of the Drill and Drive Apparatus 10

While the tool holder 14 is separated from the tube assembly 12, the user inserts the drill bit 68 into the first tool recess 60 while urging the tool locking collar 76 against the spring bias of the tool spring 80 to move the tool locking collar from a tool lock position (shown in solid lines in FIG. 6) to a tool release position (shown in phantom lines in FIG. 6). Thereafter, the user releases the tool locking collar 76 so as to allow the tool locking collar 76 to return to the tool lock position thereby locking the drill bit 68 to the tool holder 14. Then, the user inserts the screwdriver bit 84 into the second tool recess 62 so as to lock the screwdriver bit to the tool holder 14.

It should be appreciated that when the tool locking collar 76 is positioned in its tool lock position, the tool locking collar 76 is positioned in contact with the E-ring 70, and the E-ring 70 is caused to extend into the first tool recess 60. Note that when the tool locking collar 76 possess the orientation as shown in solid lines in FIG. 6, the central finger 72 is positioned in the first tool recess 60 and also in a groove defined in a base of the drill bit 68 thereby locking the drill bit 68 to the tool holder 14. Also note that when the tool locking collar 76 possess the orientation as shown in phantom lines in FIG. 6, the central finger 72 is located away from the first tool recess 60 and also located away from the groove defined in the base of the drill bit 68 thereby releasing the drill bit 68 from the tool holder 14.

Thereafter, the user inserts the tool holder 14 into the tube assembly 12 so that the screwdriver bit 84 is advanced into the tool chamber 16 as shown in FIG. 2. Then, the user operates the tube locking mechanism 20 so as to enable the tool holder 14 to be locked to the tube assembly 12. In particular, the user urges the tube locking collar 24 against the spring bias of the tube spring 26 so as to move the tube locking collar 24 from a tube lock position (shown in solid lines in FIG. 4) to a tube release position (shown in phantom lines in FIG. 4).

After the tool holder is partially located in the tube assembly 12 as shown in FIG. 1, the user releases the tube locking collar 24 so as to lock the tool holder 14 to the tube assembly 12.

The user then operates the drill 31 so as to rotate the tube assembly 12 and consequently the tool holder 14. As the tool holder 14 rotates, the drill bit 68 is caused to rotate. As the drill bit is rotating, the user advances the drill 31 and consequently the drill bit 68 into a workpiece so as to create a hole.

Thereafter, the user retracts the drill bit 68 from the hole and operates the tube locking mechanism 20 so as to unlock the tool holder 14 from the tube assembly 12. In particular, the user urges the tube locking collar 24 against the spring bias of the tube spring 26 so as to move the tube locking collar from the tube lock position (shown in solid lines in FIG. 4) to the tube release position (shown in phantom lines in FIG. 4). When the tube locking collar 24 is positioned in its tube lock position, the tube locking collar 24 is positioned in contact with the ball 22, and the ball 22 extends into the tool chamber 16. Note that when the tool holder 14 possesses the orientation as shown in FIG. 1, the ball 22 is positioned in the first locking groove 102 thereby locking the tool holder 14 to the tube assembly 12 with the screwdriver bit 84 exposed outside of the tool chamber 16. Also note that when the tool holder 14 possesses the orientation as shown in FIG. 2, the ball 22 is positioned in the second locking groove 104 thereby locking the tool holder 14 to the tube assembly 12 with the drill bit 68 exposed outside of the tool chamber 16.

Then, after the tool holder 14 is unlocked from the tube assembly 12, the user rotates the tool holder 180°. Thereafter, the user inserts the rotated tool holder 14 into the tube assembly 12 so that the drill bit 68 is advanced into the tool chamber 16 as shown in FIG. 1. Then, the user operates the tube locking mechanism 20 so as to cause the tool holder 14 to be locked to the tube assembly 12 as described above. Note that while the tool holder 14 is positioned in this orientation relative to the tube assembly 12, the screwdriver bit 84 is exposed for use.

The user then places the tip of a threaded side of a screw in the hole located in the workpiece. Thereafter, the use contacts the other end of the screw with an operative end 83 of the screwdriver bit 84 and then advances the screw sleeve 88 over the screw from a bit access position (shown in solid lines in FIG. 1) to a screw guiding position (shown in phantom lines in FIG. 1). Note that the operative end 83 of the screwdriver bit 84 is located outside of the screw guiding cavity 89 when the screwdriver bit 84 is locked to the holder body 58 and the movable screw sleeve 88 is positioned in the bit access position. Also note that the operative end 83 of the screwdriver bit 84 is located within the screw guiding cavity 89 when the screwdriver bit 84 is locked to the holder body 58 and the movable screw sleeve 88 is positioned in the screw guiding position.

Thereafter, the user operates the drill 31 to rotate the screw into the workpiece while the screw is located in the screw guiding cavity 89 of the screw sleeve 88 so as to guide the screw during its advancement into the workpiece.

It should be appreciated that the length of a drill bit which may be used with the drill and drive apparatus 10 is not limited by the size of the tube body 13 of the tube assembly 12. For instance, FIG. 9 shows a drill bit 106 being used in the drill and drive apparatus of the present invention. The drill bit 106 has a first length which causes it to extend about half way through the shank 60. In particular, the drill bit 106 extends through the first shank opening 32 and further extends about one half way through the bit passage 36. Alternatively, FIG. 1 shows the drill bit 68 being used in the drill and drive apparatus of the present invention. The drill bit 68 has a second length which causes it to extend entirely through the shank 60. In particular, the drill bit 68 extends through the first shank opening 32, the passage 36, and the second shank opening 34. In fact, the drill and drive apparatus 10 does not limit the length of a drill bit used therewith at all. No limitation is imposed on the size of the drill bit by the drill and drive apparatus 10 because the terminal end portion of the drill bit is allowed to extend out of the apparatus 10 through the shank 30. Thus, the only limitation on the size of the drill bit used with the drill and drive apparatus 10 is imposed by the internal configuration of the chuck of the drill 31.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

There are a plurality of advantages of the present invention arising from the various features of the drill and drive apparatus described herein. It will be noted that alternative embodiments of the drill and drive apparatus of the present invention may not include all of the features described yet still benefit from at least some of the advantages of such features. Those of ordinary skill in the art may readily devise their own implementations of the drill and drive apparatus that incorporate one or more of the features of the present invention and fall within the spirit and scope of the present invention as defined by the appended claims. For example, while the first tool locking mechanism 52 and the second tool locking mechanism 56 have each been specifically described as being a particular type of locking mechanism and numerous advantages result therefrom, many advantages of the present invention may still be obtained if other types of locking mechanisms are used in the drill and drive apparatus 10 as the first locking mechanism 52 and/or the second locking mechanism 56.

What is claimed is:

1. A drill and drive apparatus, comprising:
   a tube assembly which defines a tool chamber, said tube assembly including a shank adapted to be received within a chuck of a drill, said shank defining (i) a first shank opening, (ii) a second shank opening, and (iii) a bit passage extending from said first shank opening to said second shank opening;
   a tool holder which is configured to be at least partially received in said tool chamber of said tube assembly, said tool holder having (i) a first tool locking mechanism at a first end portion thereof, and (ii) a second tool locking mechanism at a second end portion thereof;
   a tube locking mechanism which is configured to releasably lock said tool holder to said tube assembly when said tool holder is at least partially received in said tool chamber; and
   a drill bit having a coupling end portion and a workpiece contacting end portion,
   wherein said coupling end portion of said drill bit is locked to said tool holder by said first tool locking mechanism,
   wherein said drill bit extends through said first shank opening, said bit passage, and said second shank opening so as to position said workpiece contacting end portion outside of said bit passage when said tool holder is locked to said tube assembly.

2. The drill and drive apparatus of claim 1, wherein said tool holder includes a holder body defining a first tool recess and having a pin aperture communicating with said first tool recess, and further wherein said first tool locking mechanism includes:
   a tool locking collar positioned around said holder body and positionable between a tool lock position and a tool release position,
   an E-ring having a central finger, wherein (i) said E-ring is interposed between said tool locking collar and said tool holder, (ii) said central finger extends through said pin aperture and into said first tool recess when said tool locking collar is positioned in said tool lock position, and (iii) said central finger is located away from said first tool recess when said tool locking collar is positioned in said tool release position, and
   a tool spring, positioned around said holder body, which biases said tool locking collar toward said tool lock position.

3. The drill and drive apparatus of claim 2, wherein:
   said holder body further defines a second tool recess and a magnet recess, and
   said second tool locking mechanism includes a magnet positioned within said magnet recess so as to apply a magnetic field in said second tool recess.

4. The drill and drive apparatus of claim 3, wherein:
   said first tool locking mechanism is configured to lock said drill bit therein, and
   said second tool locking mechanism is configured to lock a screwdriver bit therein.

5. The drill and drive apparatus of claim 1, wherein said tube assembly includes a tube body having a ball aperture defined therein which communicates with said tool chamber, and further wherein said tube locking mechanism includes:
   a tube locking collar positioned around said tube body and positionable between a tube lock position and a tube release position,
   a ball positioned within said ball aperture, wherein (i) said ball extends into said tool chamber when said tube locking collar is positioned in said tube lock position, and (iii) said ball is located away from said tool chamber when said tube locking collar is positioned in said tube release position, and a tube spring, positioned around said tube body, which biases said tube locking collar toward said tube lock position.

6. A drill and drive apparatus, comprising:

a tube assembly which defines a tool chamber, said tube assembly including a shank configured to be received within a chuck of a drill;

a tool holder which is configured to be at least partially received in said tool chamber of said tube assembly, said tool holder having (i) a holder body, and (ii) at least one tool locking mechanism located at an end portion of said holder body; and a tube locking mechanism which is configured to releasably lock said tool holder to said tube assembly when said tool holder is at least partially received in said tool chamber, wherein said tube assembly includes a tube body, wherein said tube body defines a drill-side passage, wherein said shank includes (i) an attachment segment having a number of splines extending outwardly therefrom, and (ii) and a polygonally shaped chuck segment, wherein said attachment segment of said shank is received within said drill-side passage, and wherein said chuck segment is located outside of said tube body.

7. The drill and drive apparatus of claim 6, wherein:

said tube body further defines a tool-side opening, said tool holder extends through said tool-side opening when said tool holder is locked to said tube assembly, said tube assembly defines a polygonally shaped interior drive surface located within said tool chamber, said tool holder defines a polygonally shaped exterior drive surface, and said interior drive surface cooperates with said exterior drive surface when said tool holder is locked to said tube assembly such that rotation of said tube assembly causes rotation of said tool holder.

8. A drill and drive apparatus, comprising:

a tube assembly having (i) a tube body which defines a tool chamber, and (ii) a shank extending from said tube body, said shank defining (i) a first shank opening, (ii) a second shank opening, and (iii) a bit passage extending from said first shank opening to said second shank opening;

a tool holder which is configured to be at least partially received in said tool chamber of said tube assembly, said tool holder having (i) a first tool locking mechanism at a first end portion thereof, and (ii) a second tool locking mechanism at a second end portion thereof; and a drill bit configured to be locked to said tool holder by said first tool locking mechanism, said drill bit extending through said first shank opening, said bit passage, and said second shank opening so as to position a workpiece contacting end portion of said drill bit outside of said bit passage and said tool chamber when said tool holder is at least partially received within said tool chamber.

9. The drill and drive apparatus of claim 8, wherein:

said tube body defines a drill-side passage, said shank includes (i) an attachment segment having a number of splines extending outwardly therefrom, and (ii) and a polygonally shaped chuck segment, said attachment segment of said shank is received within said drill-side passage, and said chuck segment is located outside of said tube body.

10. The drill and drive apparatus of claim 9, wherein:

said tube body further defines a tool-side opening, said tool holder extends through said tool-side opening when said tool holder is at least partially received in said tool chamber, said tube assembly defines a polygonally shaped interior drive surface located within said tool chamber, said tool holder defines a polygonally shaped exterior drive surface, and said interior drive surface cooperates with said exterior drive surface when said tool holder is at least partially received in said tool chamber such that rotation of said tube assembly causes rotation of said tool holder.

11. The drill and drive apparatus of claim 8, wherein said tool holder includes a holder body defining a first tool recess and having a pin aperture communicating with said first tool recess, and further wherein said first tool locking mechanism includes:

a tool locking collar positioned around said holder body and positionable between a tool lock position and a tool release position, an E-ring having a central finger, wherein (i) said E-ring is interposed between said tool locking collar and said tool holder, (ii) said central finger extends through said pin aperture and into said first tool recess when said tool locking collar is positioned in said tool lock position, and (iii) said central finger is located away from said first tool recess when said tool locking collar is positioned in said tool release position, and a tool spring, positioned around said holder body, which biases said tool locking collar toward said tool lock position.

12. The drill and drive apparatus of claim 11, wherein:

said holder body further defines a second tool recess and a magnet recess, and said second tool locking mechanism includes a magnet positioned within said magnet recess so as to apply a magnetic field in said second tool recess.

13. The drill and drive apparatus of claim 12, wherein:

said first tool locking mechanism is configured to lock said drill bit therein, and said second tool locking mechanism is configured to lock a screwdriver bit therein.

14. The drill and drive apparatus of claim 8, further comprising a tube locking mechanism which is configured to releasably lock said tool holder to said tube assembly when said tool holder is at least partially received in said tool chamber.

15. The drill and drive apparatus of claim 14, wherein said tube body has a ball aperture defined therein which communicates with said tool chamber, and further wherein said tube locking mechanism includes:

a tube locking collar positioned around said tube body and positionable between a tube lock position and a tube release position, a ball positioned within said ball aperture, wherein (i) said ball extends into said tool chamber when said tube locking collar is positioned in said tube lock position, and (iii) said ball is located away from said tool chamber when said tube locking collar is positioned in said tube release position, and a tube spring, positioned around said tube body, which biases said tube locking collar toward said tube lock position.

16. A drill and drive apparatus, comprising:

a tube assembly which defines a tool chamber, said tube assembly including a shank adapted to be received within a chuck of a drill;

a tool holder which is configured to be at least partially received in said tool chamber of said tube assembly, said tool holder having (i) a holder body, (ii) a first tool locking mechanism located at a first end portion of said holder body, (iii) a second tool locking mechanism located at a second end portion of said holder body, and (iv) a movable screw sleeve positioned around said holder body, said movable screw sleeve being movable relative to said holder body in an axial direction defined by an axis of rotation of said tool holder during operation of the drill and drive apparatus; and a tube locking mechanism which is configured to releasably lock said tool holder to said tube assembly when said tool holder is at least partially received in said tool chamber.

17. The drill and drive apparatus of claim 16, wherein:

said holder body further defines a tool recess and a magnet recess at said second end portion of said holder body, said second tool locking mechanism includes a magnet positioned within said magnet recess so as to apply a magnetic field in said second tool recess, and said movable screw sleeve is positioned around said second end portion of said holder body.

18. The drill and drive apparatus of claim 17, wherein:

said movable screw sleeve is movable between a bit access position and a screw guiding position, said movable screw sleeve defines a screw guiding cavity, said second tool locking mechanism is configured to lock a screwdriver bit therein, an operative end of said screwdriver bit is located outside of said screw guiding cavity when said screwdriver bit is locked to said holder body and said movable screw sleeve is positioned in said bit access position, and said operative end of said screwdriver bit is located within said screw guiding cavity when said screwdriver bit is locked to said holder body and said movable screw sleeve is positioned in said screw guiding position.

19. The drill and drive apparatus of claim 18, wherein:

said screwdriver bit includes a metallic material, and magnetic attraction between said magnet and said screwdriver bit locks said screwdriver bit to said holder body.

20. The drill and drive apparatus of claim 16, wherein said tube assembly includes a tube body having a ball aperture defined therein which communicates with said tool chamber, and further wherein said tube locking mechanism includes:

a tube locking collar positioned around said tube body and positionable between a tube lock position and a tube release position, a ball positioned within said ball aperture, wherein (i) said ball extends into said tool chamber when said tube locking collar is positioned in said tube lock position, and (iii) said ball is located away from said tool chamber when said tube locking collar is positioned in said tube release position, and a tube spring, positioned around said tube body, which biases said tube locking collar toward said tube lock position.

21. The drill and drive apparatus of claim 20, wherein:

said tube body defines a tool-side opening, said tool holder extends through said tool-side opening when said tool holder is locked to said tube assembly, said tube body defines a polygonally shaped interior drive surface located within said tool chamber, said holder body defines a polygonally shaped exterior drive surface, said interior drive surface cooperates with said exterior drive surface when said tool holder is locked to said tube assembly such that rotation of said tube assembly causes rotation of said tool holder, said tube body further defines (i) a first locking groove located on a first side of said polygonally shaped exterior drive surface, and (ii) a second locking groove located on a second side of said polygonally shaped exterior drive surface, and said first locking groove, said second locking groove, and said polygonally shaped exterior drive surface are all located outside of said screw guiding cavity both (i) when said screwdriver bit is locked to said holder body and said movable screw sleeve is positioned in said bit access position, and (ii) when said screwdriver bit is locked to said holder body and said movable screw sleeve is positioned in said screw guiding position.

22. A drill and drive apparatus, comprising:

a tube assembly which defines a tool chamber, said tube assembly including a shank adapted to be received within a chuck of a drill;

a tool holder which is configured to be at least partially received in said tool chamber of said tube assembly, said tool holder having (i) a holder body, and (ii) at least one tool locking mechanism located at an end portion of said holder body; and (iii) a movable screw sleeve positioned around said holder body, said movable screw sleeve being movable relative to said holder body in an axial direction defined by an axis of rotation of said tool holder during operation of the drill and drive apparatus; and a tube locking mechanism which is configured to releasably lock said tool holder to said tube assembly when said tool holder is at least partially received in said tool chamber.

23. The drill and drive apparatus of claim 22, wherein:

said tool holder has defined therein a magnet recess, said at least one tool locking mechanism includes a magnet located within said magnet recess.

24. The drill and drive apparatus of claim 23, wherein said movable screw sleeve is positioned around said magnet.

25. The drill and drive apparatus of claim 24, wherein said movable screw sleeve is movable in relation to said magnet.

* * * * *